United States Patent [19]

Schuckmann

[11] Patent Number: 4,651,904
[45] Date of Patent: Mar. 24, 1987

[54] DISPENSER FOR PASTY COMPOSITIONS, PARTICULARLY TOOTHPASTE DISPENSER

[75] Inventor: Alfred V. Schuckmann, Kervendonk, Fed. Rep. of Germany

[73] Assignee: Bramlage Gesellschaft mit Beschränkter Haftung, Lohne/Oldenburg, Fed. Rep. of Germany

[21] Appl. No.: 675,571

[22] Filed: Nov. 28, 1984

[30] Foreign Application Priority Data

Dec. 2, 1983 [DE] Fed. Rep. of Germany ....... 3343680
Aug. 25, 1984 [DE] Fed. Rep. of Germany ... 8425201[U]

[51] Int. Cl.⁴ .............................................. B67D 5/42
[52] U.S. Cl. ..................................... 222/383; 222/207
[58] Field of Search ............... 222/184, 206, 207, 209, 222/212, 213, 215, 372, 380, 383, 385, 386, 391

[56] References Cited

U.S. PATENT DOCUMENTS

| | | | |
|---|---|---|---|
| 3,486,663 | 12/1969 | Humphrey | 222/207 |
| 3,715,060 | 2/1973 | Benson | 222/207 |
| 3,987,938 | 10/1976 | Cooprider et al. | 222/209 |
| 4,330,071 | 5/1982 | Ohlson | 222/207 |
| 4,457,454 | 7/1984 | Meshberg | 222/95 |
| 4,474,313 | 10/1984 | Sieverding | 222/211 |
| 4,502,617 | 3/1985 | Stecker et al. | 222/385 |

FOREIGN PATENT DOCUMENTS 2901717 7/1980 Fed. Rep. of Germany.

*Primary Examiner*—Joseph J. Rolla
*Assistant Examiner*—Michael S. Huppert
*Attorney, Agent, or Firm*—Martin A. Farber

[57] ABSTRACT

A dispenser for pasty compositions, particularly a toothpaste dispenser, with pump-like actuation for the portioned delivery of the content from a nozzle discharge channel, in which connection the pump chamber, which can be reduced in volume by displacement of an actuator against spring action, lies, as seen in the flow path, between two valves, one of which is connected with the storage space and the other with the nozzle discharge channel. By a simple structural shape which is easy to manufacture and easy to use, the two valves are located on a straight-line which extends along their extension through the nozzle discharge channel and the actuation of the pump takes place transverse to said straight line.

4 Claims, 13 Drawing Figures

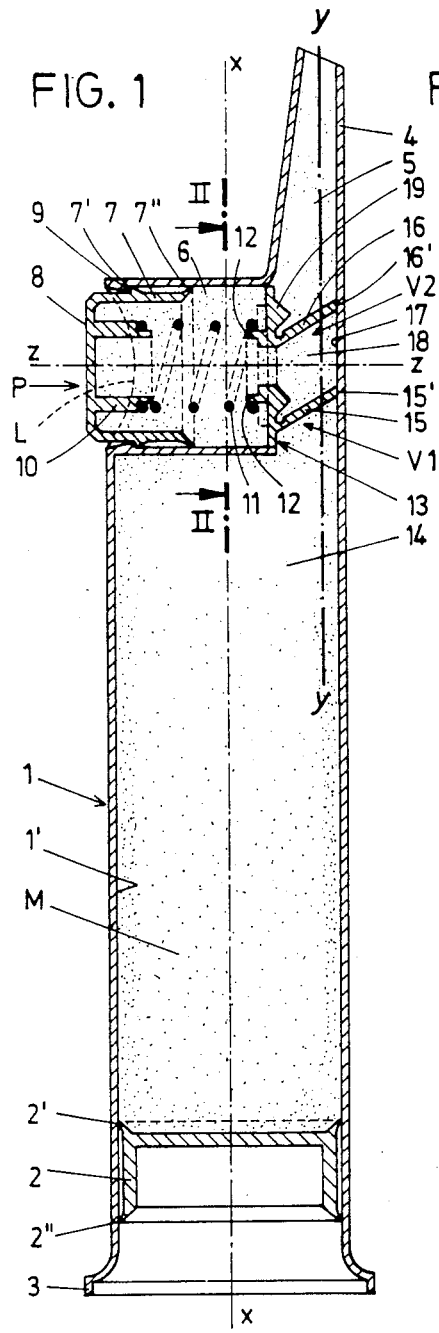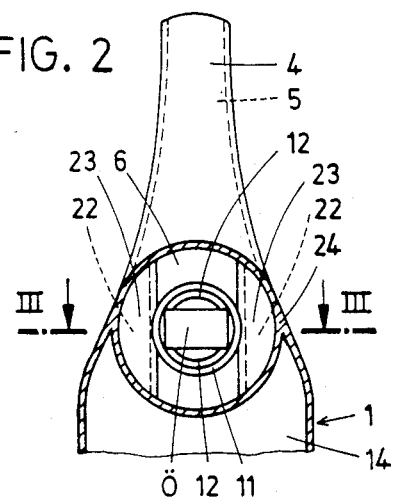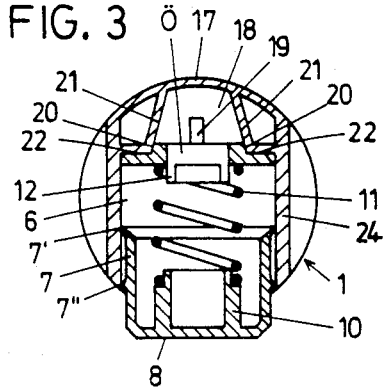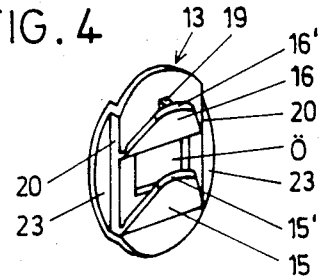

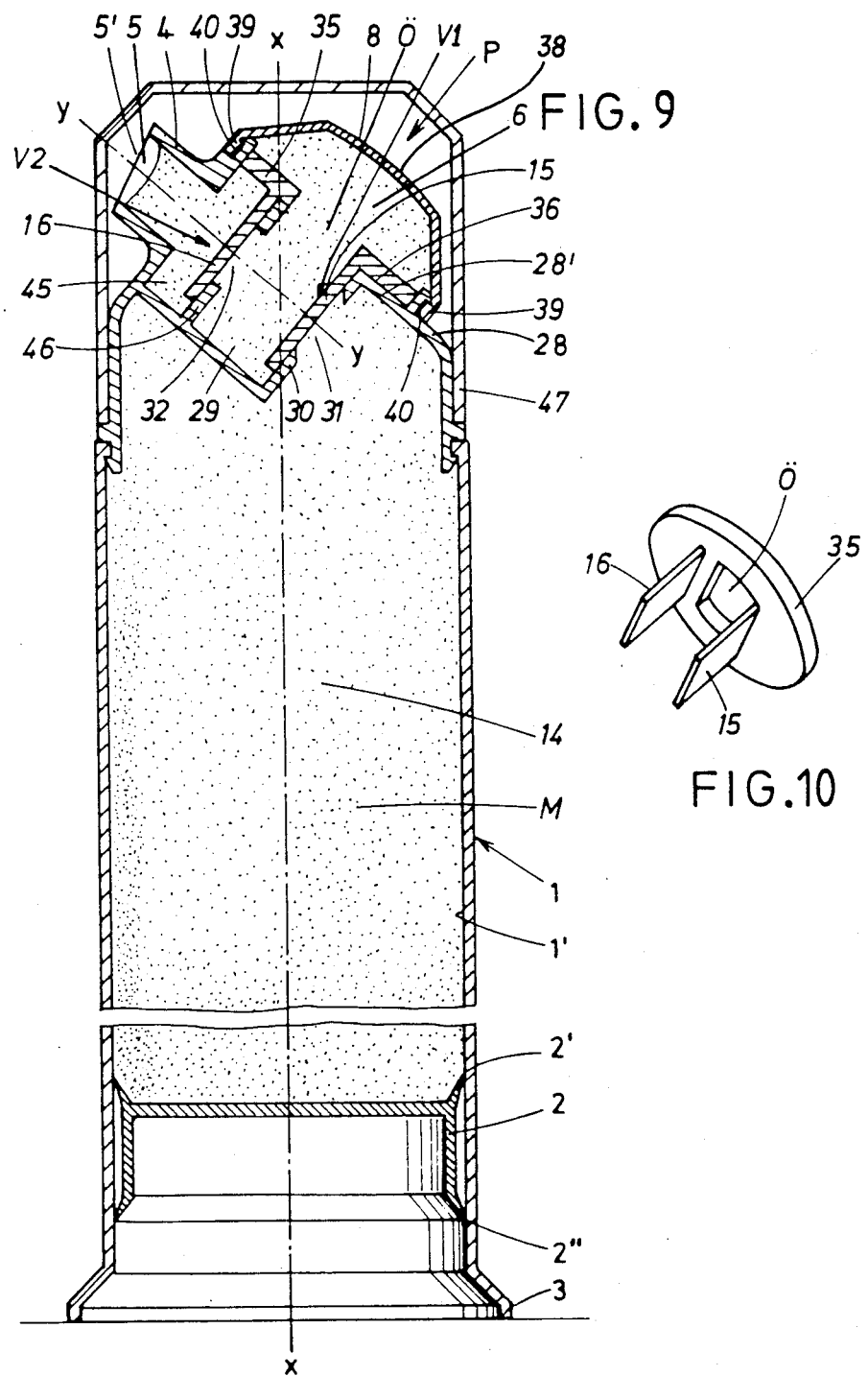

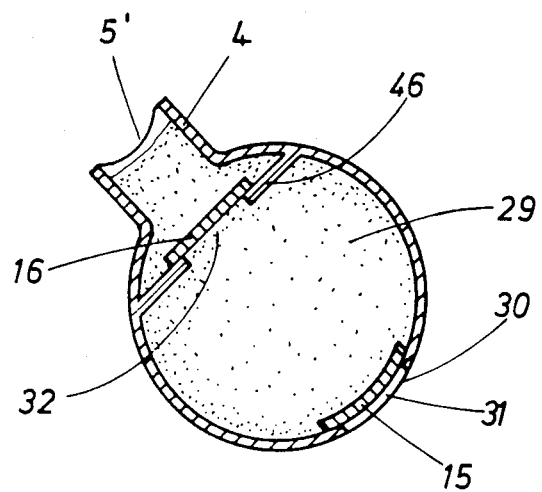
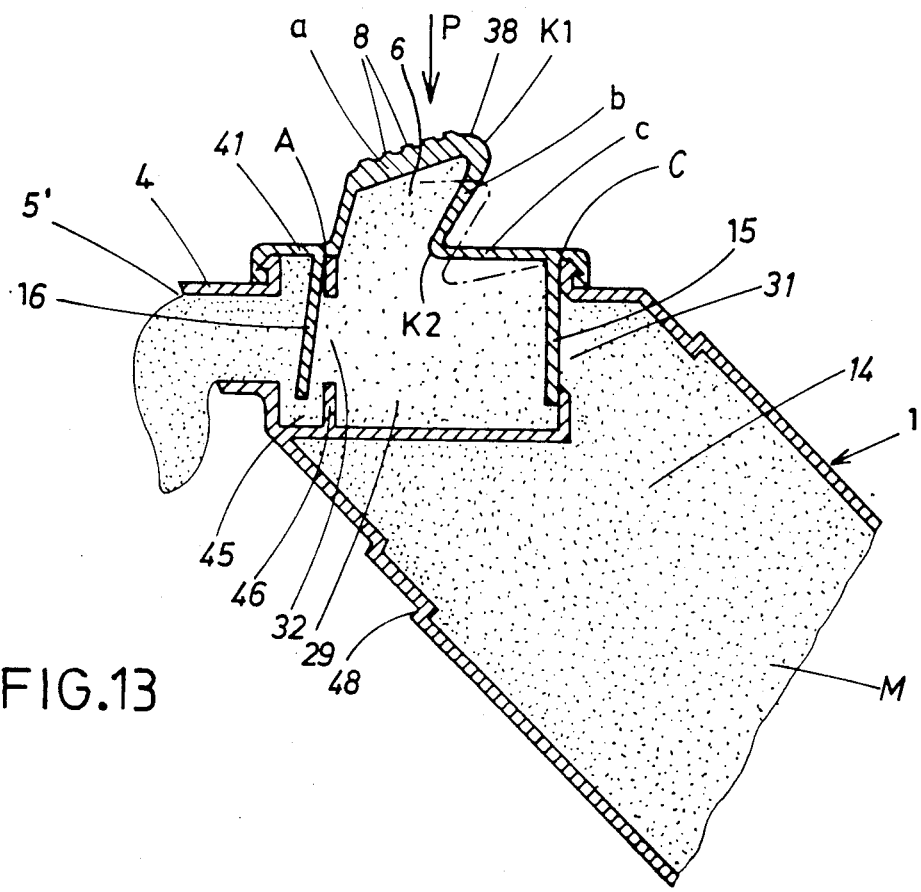

DISPENSER FOR PASTY COMPOSITIONS, PARTICULARLY TOOTHPASTE DISPENSER

FIELD AND BACKGROUND OF THE INVENTION

The present invention relates to a dispenser for pasty compositions, particularly a toothpaste dispenser, with pump-like actuation for the delivery, in portions, of the contents from a nozzle outlet channel, the pump chamber, whose volume can be reduced by displacing an actuator against spring action, located, as seen in the flow path, between two valves, one of which is connected with the storage space and the other with the nozzle outlet channel.

A dispenser of this kind is known from Federal Republic of Germany OS No. 29 01 717. In that case one valve is located on the bottom side of the pump space and the other valve, which faces the nozzle outlet channel, is arranged on the wall side of said pump chamber. This leads to a transverse deflection and thus to an intensive displacement of the composition and correspondingly to high friction values; operation is made difficult. The valve arranged on the bottom side of the pump chamber extends within the pump space. The structural shape is therefore relatively complicated and too expensive to manufacture and assemble for a mass-produced article.

The object of the present invention is to simplify the manufacture and assembly of a dispenser of this kind, in connection with which a better uniformizing of the flow conditions is also to be obtained.

SUMMARY OF THE INVENTION

This object is achieved by positioning the two valves (V1, V2) on a straight line (y—y) which extends along their extension through the nozzle outlet channel (5) and the actuation of the pump (arrow P) takes place transverse to said straight line.

As a result of this development the manufacture and assembly of the dispenser are substantially simplified. A more elongated conveyance path is present which has a favorable effect on the flow. The pump chamber is located laterally thereof. The pump movement takes place transversely with respect to the conveyor path, which is convenient for operation. The pump chamber is in communication with both the storage space and the nozzle outlet channel via only a single opening which lies between the two valves. Uncomplicated molds are used. The intermediate position of the opening now makes it possible to arrange also the valve facing the storage space outside of the pump chamber. Thus, sections of the wall of the outlet channel can be used in simple manner as valve seat surfaces for both valves. There is produced a flow-favorable double valve chamber which lies in front of the opening and is aligned with the delivery path. The pump chamber itself remains free for the stroke of the pump piston, which can now be shorter. For construction it is advantageous to to arrange the opening in a bottom piece of the pump chamber, the bottom piece carrying the flaps of the valves. The bottom piece can be shaped, with respect to the cross section of the opening, as a function of the specific viscosity of the contents and can be conveniently provided an insert without having to change the base body of the dispenser. Due to the fact that the bottom piece of the pump chamber has centering shoulders between which the valve flaps extend, the latter can remain free of holding or assembling forces, so that a high degree of reliability in operation is present. The bottom piece, which is arranged in the path of the mere plug connection is pressed by the spring of the actuator against the supporting surface of the dispenser housing. The spring thus has a two-fold function. Special fastening means can be dispensed with here. In order to limit the swinging motion of the valve flaps the bottom piece of the pump chamber has stop ribs for the valve flaps. In this way, one valve flap can also not place itself in blocking manner in front of the opening of the bottom piece upon the suction stroke. The spring can be developed simultaneously on the actuator or else be associated with it in the form of a separate structural part, in which case then the back of the bottom piece facing the inside of the chamber would have corresponding spring centering means. The conventional compression spring can furthermore also be completely dispensed by forming the pump chamber by means of a bellows which resiliently resumes its shape.

It is furthermore of advantage to form the inlet and outlet cross sections of the valves as openings in the outer wall of a chamber which is arranged in front of the nozzle and divided off from the storage space. The portion of the composition which is ready to be dispensed is now located in a chamber of its own which lies within the flow path. This last-mentioned chamber serves, in practice, a sluice function which is favorable for the flow. It is also advantageous for the inner volume of the chamber to be larger than or equal to that of the squeeze head which is associated as a cover with the chamber. Beyond the displacement volume of the squeeze-head space there can even be obtained in this connection also a variation of the amount dispensed, in the manner that the squeeze head can extend completely or partially also into the adjoining chamber. An association of the squeeze head which is dependable in use is obtained by a clip attachment between the edge of the squeeze head and an undercut annular groove in the housing. Utilizing the flexibility or resiliency of the material of the squeeze head, it is possible in this case at the same time to obtain the necessary sealing by simple means. With regard to the desired simplified construction it is furthermore of advantage for the valve flaps to be developed integrally with the squeeze head, namely on the bottom of a flat, annular zone which bears the squeeze-head actuating surface as an angularly bent bulge, the rear surface of the bulge having an inwardly directed bent course. Such a bent course, which is developed, in practice, as a fold zone, can be so located with regard to the operation of the valve flaps that they operate in the sense of a valve, i.e. the flaps which are rooted in the fold articulation regions are acted on, on the one side, in the direction of release and, on the other side, in the closing direction. This also contributes to the desired flow-favorable development.

BRIEF DESCRIPTION OF THE DRAWINGS

The object of the invention will be described in further detail below on basis of various embodiments shown in the drawing, in which:

FIG. 1 is a vertical section through the dispenser of the first embodiment;

FIG. 2 is a section along the line II—II of FIG. 1;

FIG. 3 is a section along the line III—III of FIG. 2;

FIG. 4 is a perspective detail view, seen from the valve flap side, of the bottom piece of the pump chamber;

FIG. 9 is a vertical section through the dispenser of the third embodiment, shown in its basic position;

FIG. 10 is a detail view, in perspective, of an insert part of FIG. 9 bearing the valve flaps;

FIG. 12 is a section along the line XII—XII of FIG. 11; and

FIG. 13 shows the dispenser of FIG. 11 in its actuation phase.

DETAILED DESCRIPTION OF THE PREFERRED EMBODIMENTS

Figure 5:
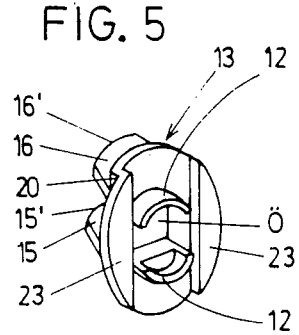
FIG. 5 is a view similar to that of FIG. 4 but seen from the rear side.

The long cylindrical housing 1 of the dispenser of the first and second embodiments contains a piston 2 which moves therein in longitudinal direction. The piston is of cup shape. Annular lips 2', 2" pointing in opposite directions extend from the rim of the cup as well as from the bottom of the cup. They move in sealingly along the inner wall 1' of the housing which is also cylindrical. The housing 1 is open at the bottom. The housing wall passes there into a standing base 3 which extends somewhat beyond the dimension of the remaining housing cross section.

The other end of the dispenser, which is opposite the base 3, forms a nozzle 4. This nozzle is located displaced eccentrically out of the longitudinal central axis x—x of the dispenser housing 1, is aligned there on the outside with the wall of the housing and extends beyond the rest of the dispenser housing by a length which corresponds essentially to the diameter of the housing. The nozzle outlet channel 5, tapers continuously down towards its free end, and has a cross section which corresponds approximately to one-fifteenth of the cross section of the column of filling material or pastry composition M.

The pasty composition M can be dispensed in portions by a pump-like actuation. One part of this dispenser mechanism comprises a cylindrical pump chamber 6 which lies spatially below the nozzle 4 and has a pump piston 7 which is supported displaceably therein against spring action by a coil compression spring 11. The path of displacement of the piston 7 is transverse to the longitudinal central axis x—x or the direction of delivery of the pasty composition M and therefore transverse to the line y—y which passes through the nozzle outlet channel 5.

The pump piston 7 is also of cup shape. Its cup bottom, which extends freely somewhat out of the pump chamber 6, forms an actuator 8. The edge of its rim is beveled. The directly guided section of the pump piston 7 forms also in this case annular sealing lips 7' and 7" on its cylindrical surface which point in opposite direction. The lip 7' which is closer to the actuator serves, at the same time as a limiting stop in the outward direction. It comes against a blocking shoulder 9 on the cylindrical inner wall of the pump chamber 6.

From the bottom of the cup a centrally located collar 10 extends towards the inner space. It surrounds the end turn there of the coil compression spring 11, whose other end rests against centering projections 12 of a bottom piece 13, developed as insert, of the pump chamber 6. The latter is arranged in communication between two valves V1, V2, the valve V1 being associated with the storage space 14 and the other valve V2 being associated with the nozzle outlet channel 5. The two valves are developed as valve flaps 15, 16 of the same size which are formed 13 on its bottom piece on the side facing away from the pump chamber 6. Their flap hinges comprise thin-walled webs in the manner of film hinges. The valve flaps 15, 16 assume, in the basic position of the mechanism, an obliquely rising direction upwards towards the right, their narrow end edges 15' and 16', due to the force of resiliency of the material, are under spring action against the corresponding inner wall 17 of a double-valve chamber 18 lying aligned (line y—y) between the nozzle channel 5 and the storage space 14. Said chamber extends on the side of the pump-chamber bottom piece 13 which is opposite the pump chamber 6. The pump chamber 6 is connected both with the storage space 14 and with the nozzle outlet channel 5 via only a single opening Ö between the two valves V1, V2.

On the valve-flap side, stop ribs 19 are developed on the bottom piece for limiting the swinging motion of the valve flaps 15 and 16. They are small projections of triangular cross section extending from the disk-shaped bottom piece 13, against the protruding points of these projections the top of the flap valves strikes upon the opening swinging motion.

The pump-chamber bottom piece 13 forms centering shoulders 20 which are in the vertical direction. They converge an insertion direction. A correspondingly converging course is assumed also by outlet channel walls 21 which extend in the direction of the housing wall and form the corresponding centering mating surfaces. Said channel walls extend from a vertical supporting surface 22 against which there rest circular-segment-shaped lugs 23 provided on the bottom piece 13, which is partially inserted into the double valve chamber 18. The narrow sides of the valve flaps 15, 16 which sides extend parallel to the outlet channel walls 21 can lie somewhat back behind the latter so that a friction-free easy flapping is present. As can be noted from FIG. 3, the support surfaces 22 extend into the wall 24 which surrounds the cylindrical pump space 6.

Figure 7:
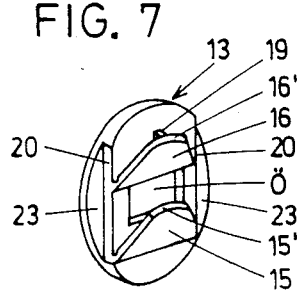
FIG. 7 shows the corresponding bottom part of FIG. 6, seen from the valve-flap side, again in perspective.
Figure 8:
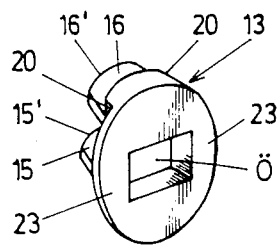
FIG. 8 shows the rear of the bottom piece of FIG. 7, in perspective.
Figure 6:
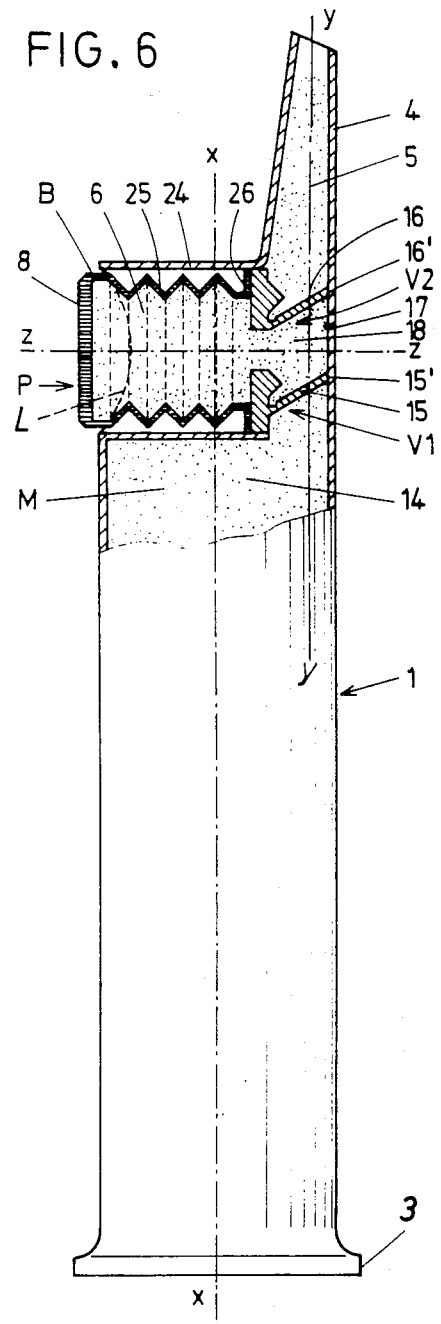
FIG. 6 shows the dispenser of the second embodiment, in a partial section.

The difference of the dispenser of the second embodiment (FIGS. 6 to 8) is that the volume-reducible pump chamber is formed there of a resilient bellows B. Here is also a cup-shaped body with an actuator 8. The bellows folds 25 lie transverse to the direction of actuation P and are of the same wall thickness except for the bottom end which is of thicker cross section. Its other end on the side of the bottom piece 13 forms an annular fastening flange 26 which points transversely outwards. Said flange is fastened, for instance, by gluing, hot sealing or the like to the back of the bottom piece 13 and is introduced together with the latter into the cavity which forms the pump chamber 6 in the first embodiment and is fastened there. For fastening of the bottom piece a detent shoulder can be used, not shown in detail. The construction of the bottom piece otherwise corresponds to that of the bottom piece 13 described above. Since the bellows B serves simultaneously as a return spring, the centering projections 12 of the previous embodiment, of course, are also dispensed with. The outer folds of the bellows are spaced a certain distance from the cylindrical inner wall of the cavity so that no jamming occurs upon the increase in cross section which is produced by the actuation.

The assembling is limited in the case of the first embodiment practically to the introduction of the bottom piece 13 and the simultaneous or subsequent insertion of the spring 11 and the pump piston 7.

The manner of operation of the dispenser is as follows: By exerting pressure on the actuator 8 in the direction indicated by the arrow P against the force of the coil compression spring 11 (or similarly against the return force of the bellows B), the volume in the pump chamber 6 is reduced. The return of the pump piston 7 caused by spring action now draws pasty composition M through the opening Ö into the pump chamber 6, with the opening of the valve V1. The suction furthermore keeps the other valve V2 closed. Thus no air can be drawn in via the nozzle outlet channel 5. The piston 2 moves up following the movement of the column of content. If the pump chamber 6 and the nozzle outlet channel 5 have been filled, the portioned delivery can start since paste composition is always drawn into the pump chamber 6 via the valve V1 and passes, upon the actuating stroke, through the valve V2 into the delivery path and is discharged in measured portions. During this discharge stroke the valve V1 is always closed. In each case there is discharged an amount which is determined by the stroke but amounts less than this can be dispensed by merely partially depressing the actuator 8.

Due to the penetration through two cylindrical figures, on the one hand the housing 1 and, on the other hand, the housing part of the pump chamber 6 which is transverse thereto, there is obtained a concave penetration line L. The end edge of the pump-space housing which corresponds to this line can advantageously serve as a depression limiting stop in that the thumb, which lies across it, comes against it there. Aside from this, however, in view of the fact that the actuating surface is of a size larger than the tip of the thumb, there is the possibility of pushing the pump piston all the way in, utilizing the maximum actuation stroke, i.e. until the front lip 7" comes against the back of the bottom piece 13. The two lateral concave throats terminate flush with the blocking shoulder 9, the back of which forms a run-on bevel for the lips 7′, 7" so as to facilitate assembly. Since plastic material is used, the blocking shoulder also has a certain flexibility. Accordingly, the bottom piece 13 can be mounted by pushing it past the blocking shoulders.

The dispenser of the third and fourth embodiments corresponds in principle to those described above. The same reference numbers have therefore been applied by analogy without, however, repeating the entire description.

The nozzle 4 of the dispenser of FIGS. 9 to 13 extends with oblique inclination to the longitudinal central axis x—x of the dispenser housing 1. The angle of inclination is about 45° and corresponds to the section line XII—XII shown in FIG. 11.

As can be noted from this figure, the nozzle 4 can be formed directly on the housing 1 or else, as is preferred in accordance with the third embodiment (FIG. 9), made as a separate headpiece 28 which is attached in simple fashion to the upper housing wall by means of a clip attachment.

The nozzle 4, developed as a relatively short tube nipple, of the separate or one-piece formed-on headpiece 28 has an inside cross sectional dimension which corresponds approximately to 5 to 10 times the cross section of the column of filling material formed by the pasty composition M. The opening 5′ of the nozzle discharge channel 5 is substantially aligned with the housing wall of the dispenser.

Between the storage space 14, which is formed by the predominant portion of the housing 1, and the nozzle 4, a chamber 29 is developed on the headpiece 28. This chamber has a cup shape and is open towards the top. Within the flow path in the direction of a straight line y—y, the wall 30 of the chamber 29 has window-like openings 31 and 32, the first of which forms an inlet cross section and the second an outlet cross section. The latter are in their turn provided with valves V1 and V2 in the form of valve flaps 15 and 16. They extend in the direction of discharge in front of the openings 31 and 32 and can be slightly pretensioned (biased) in the direction towards the valve seat. The openings 31, 32 in this case also are on the straight line y—y which is aligned through the nozzle outlet channel 5.

In the embodiment shown in FIGS. 9 and 10 the valve flaps 15, 16 extend, as vertically protruding tabs developed on an insert path 35 made of material of flexing elasticity. It corresponds essentially to the bottom piece 13 of the above-described embodiment and is developed as a disk which is interrupted centrally between the valve flaps 15, 16 and introduced into a receiver 36 on the oblique cover 28′ of the headpiece 28. The relatively large central opening of the insert part 35 bears the reference number Ö. It corresponds essentially to the width of the chamber 29, measured in the discharge direction. Above the chamber 29 there extends a squeeze head 38. This is a dome-shaped rubber cap clipped onto the headpiece 28. This squeeze head forming the actuator 8 is held by a clip-on connection between the rim 39 of the squeeze head and an annular groove 40 of the dispenser housing 1 and headpiece 28 respectively.

Figure 11:
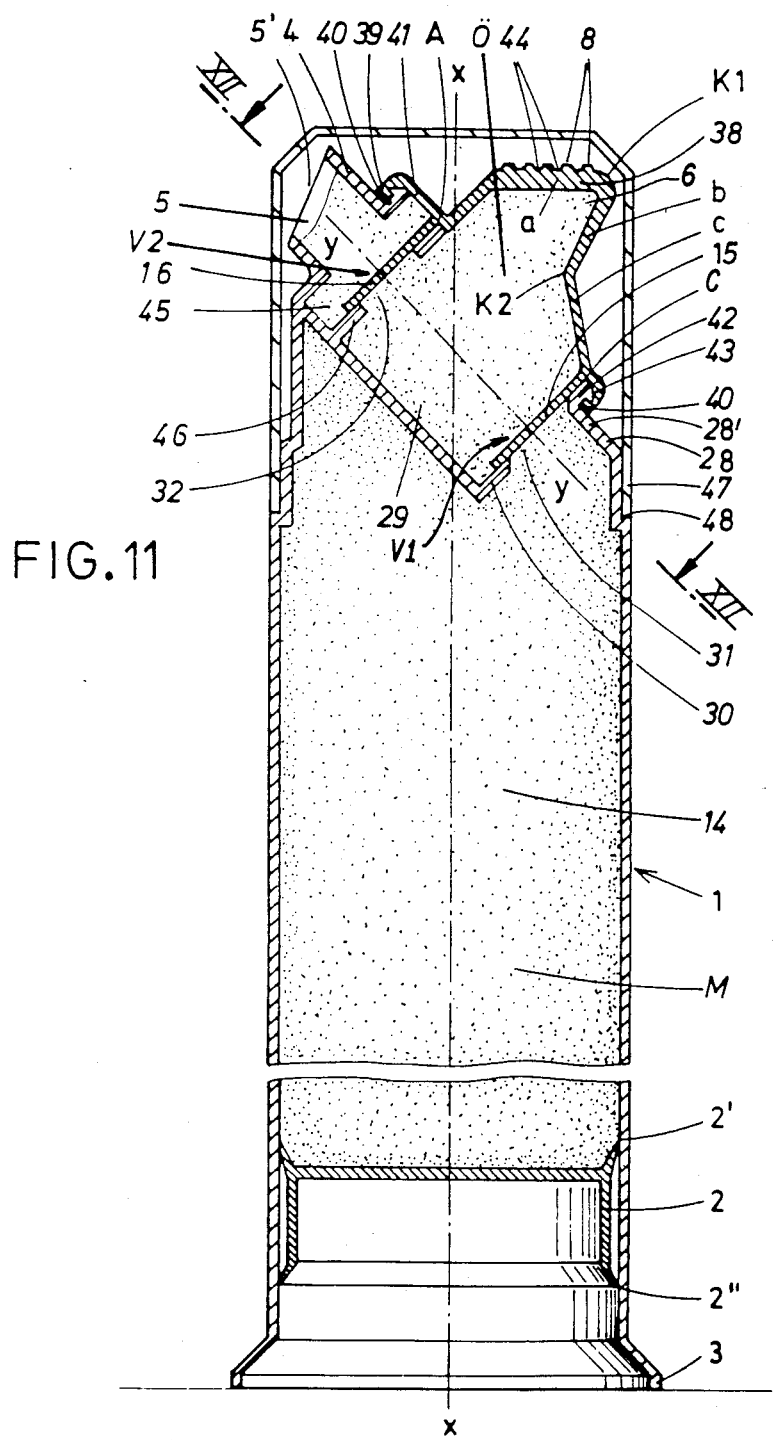
FIG. 11 is a vertical section through the dispenser of the fourth embodiment, also shown in basic position.

In the embodiment shown in FIGS. 11 to 13, the valve flaps 15 and 16 are developed integral as in one piece with the squeeze head 38. They extend from the bottom of a flat annular zone 41 which bears the squeeze-head actuator 8 in the form of an angularly bent bulge, this zone being adjoined by the squeeze-head edge 39 shaped as an annular wall, the edge engaging also in this embodiment in an annular groove 40. The annular groove is located on the outside of a collar 42 which protrudes from the cover 28′. The outer rim edge of the collar forms a bevel 43 which facilitates placing the squeeze head 38 thereon, the rear flank of said bevel being a part of the undercut annular groove 40.

The squeeze head actuator 8, which is directed horizontally in the normal standing position of the dispenser, has transverse grooves 44 in order to improve the operator's pressing grip. This section a, which is of thick cross section and forms the actuator, terminates at a sharp reversal peak K1 in a section b which extends at an acute angle downwardly and inwardly and is continued then by a reversal portion K2 directed towards the inside of the chamber in a section c which extends into the annular zone 41. This forms a bent course foldable within each other, in which connection the sections a and b decrease in angle (see FIG. 13) and the sections b and c which are at an obtuse angle to each other and form an outwardly open angle pass into an acute-angle configuration. This positive deformation of the squeeze head in the direction of a collapsed "Z" leads to a suitable loading or support of the flap movement of the valve flaps 15, 16. Thus the valve flap 16, which is associated with the discharge cross section (opening 32), is tilted in the direction of opening around the housing-side support point A. The other valve flap 15, which acts on the stationary housing point C, acts upon the valve in the closing direction since the chamber-side angle between the section c and the valve 15 is reduced (see FIG. 13). Thus the composition displaced by actuating the squeeze head 38 can be delivered with a more favorable flow, particularly as the inside volume of the chamber 29 is greater than or equal to that of the squeeze head 38 which is coordinated in the manner of a cover with the chamber 29. In the embodiment shown in FIGS. 11 to 13 there is furthermore the advantageous possibility of delivering a larger dispensing portion beyond the portion corresponding to the volume of the squeeze head 38 as a result of the fact that the wall of the squeeze head can be pushed into the chamber 29.

In front of the valve flap 16 lying on the outside of the chamber, sufficient free space 45 remains for the unimpeded lifting off of the valve flap 16 there. This free space 45 is larger in cross section than the cross section of the nozzle 4. The valve seat present there is formed by a transverse wall 46 of the headpiece 28, which wall divides the chamber 29 from the free space. In accordance with the fourth embodiment, the valve flap 15 assumes a degree of curvature which corresponds to the curved course of the inner surface of the outer wall (see FIG. 12), which further favors the return into the closed position.

Briefly summarized, these dispensers operate as follows: By pressure on the squeeze head 38 in the pump-actuating direction P and therefore displacement of its actuator 8 transversely with respect to the straight line y—y, the composition present in the chamber 29, which has been divided off by the valve flap 15 from the remaining supply, emerges out of the nozzle 4 with the lifting of the valve flap 16 corresponding to the displacement volume. Upon release, the squeeze head 38, which forms the cover of the chamber 29 moves as a result of its resiliency back into its initial position. The vacuum thereby produced in the chamber 29 closes the valve flap 16 on the side of outlet cross section and opens the other valve flap 15, through the inlet cross section by which pasty composition M is drawn from the storage space 14 into the chamber 29. The piston 2 travels up with the filled column thereabove to which it practically sticks.

If the piston has the known per se one-sided acting lock then the valve flap 15 can be dispensed with, depending on the viscosity of the pasty composition.

The dispenser can be provided with a protective cap 47, the lower end edge of which rests on an annular shoulder 48 on the housing.

Herein the actuator is defined to include the movable parts (e.g., 7, 11, B, 25, 38, a, b, c, K2) for the pump-like actuation on the pump chamber.

What is claimed is:

1. In a dispenser for contents of pasty compositions from a storage space, the dispenser having an actuator providing a pump-like actuation for portioned delivery of the contents from a nozzle outlet channel, and having a pump chamber the volume thereof being decreasable against spring action by displacement of the actuator, the pump chamber being located between two valves with respect to a direction of flow of the contents, one of the valves communicating with the storage space and the other valve communicating with the nozzle outlet channel, the improvement wherein
    said two valves lie on a straight line which extends through the nozzle outlet channel,
    said actuator is arranged such that the actuation is transversely to said straight line,
    a bottom piece of the pump chamber forms an opening between said two valves, said bottom piece carries two valve flaps of said two valves respectively,
    a dispenser housing defining said storage space,
    said dispenser housing has support surfaces,
    said bottom piece has stop ribs, said valve flaps abutting respective of said stop ribs from time to time,
    said actuator includes spring means for pressing said bottom piece against said support surfaces of the dispenser housing.
2. The dispenser according to claim 1, wherein said bottom piece has centering shoulders, said valve flaps extend between said centering shoulders.
3. The dispenser according to claim 1, wherein said spring means is a coil compression spring.
4. The dispenser according to claim 1, wherein said straight line passes centrally through said flaps of said valves and axially through said nozzle outlet channel.

* * * * *